United States Patent [19]

Etzold

[11] 4,284,676

[45] Aug. 18, 1981

[54] METHOD AND APPARATUS FOR FLATTENING WOOD BASED PANELS

[76] Inventor: Roland Etzold, 233 Lassen Ave., Mountain View, Calif. 94043

[21] Appl. No.: 10,237

[22] Filed: Feb. 8, 1979

Related U.S. Application Data

[62] Division of Ser. No. 726,901, Sep. 27, 1976, Pat. No. 4,139,407.

[51] Int. Cl.$^{3}$ ............................................... B32B 3/28

[52] U.S. Cl. .................................... 428/167; 428/172

[58] Field of Search ................ 428/156, 170, 171–172, 428/106, 167; 144/254, 257, 320 R, 320 A, 328, 327, 309 B; 156/209, 219, 220

[56] References Cited

U.S. PATENT DOCUMENTS

| | | | |
|---|---|---|---|
| 1,426,028 | 8/1922 | Wright | 144/255 |
| 1,809,681 | 9/1931 | Elmendorf | 144/320 X |
| 2,695,857 | 11/1954 | Lewis et al. | 144/328 |
| 2,708,296 | 5/1955 | Soehner | 428/106 |
| 2,830,004 | 4/1958 | Lyons | 156/220 |

*Primary Examiner*—David A. Simmons

*Attorney, Agent, or Firm*—Limbach, Limbach & Sutton

[57] ABSTRACT

This invention relates to a method and an apparatus for flattening wood based panels such as plywood, flake board or fiber board panels, which have an undesirable curvature, due to an imbalanced construction, or due to a certain production process. In particular this invention relates to the flattening of a panel as described in U.S. Pat. No. 3,878,017.

2 Claims, 4 Drawing Figures

METHOD AND APPARATUS FOR FLATTENING WOOD BASED PANELS

This is a divisional of Application Ser. No. 726,901, filed Sept. 27, 1976 now U.S. Pat. No. 4,139,407.

BACKGROUND OF THE INVENTION

Wood based panels such as plywood, flake board or fiber board have generally a balanced construction. This means that in thickness and in composition, both halves of the panel from their respective outer surfaces to the center plane are identical. For example, in a particle board or flake board panel, each half will have about the same amount and distribution of fine and course material, as well as the same distribution of density, and in a plywood panel the grain direction of the outer veneer layers are usually parallel to each other and these veneer layers are generally of the same thickness and species.

If however the product is not symmetrical, such as a plywood panel having face veneers of different thicknesses or species, or the symmetry is lost during the process, such as in a flake board panel which is cured under different temperatures on opposing faces, or the symmetry is lost by additions such as an overlay, applied to only one side of a panel, then such a panel will often acquire a curvature which may impede its future use. Especially "Plank-Ply" panels made as described in my U.S. Pat. No. 3,878,017 have the tendency to bow across the direction of the face grain, resulting usually in concave faces. These panels have faces of lumber planks or veneer strips which may vary in thickness and are produced in matching pairs, whereby a thick face plank matches a thin face plank in the mating panel during the laminating process.

Some wood based panels can be shaped after their manufacture by bending a panel under controlled conditions beyond its elastic limit. This may for example be done with a number of rollers such as are used when bending sheet metal or iron plates. However, using this method, the points of contact between the panel and the individual rollers should be close together, since otherwise, the tension side of the panel will develop large cracks. This limits the diameter of the rollers and permits only to shape relatively thin panels. Another disadvantage of this method is that panels having thickness variations such as "Plank-Ply" cannot be shaped successfully by such rollers unless the roller system has complicated adjustment means to accommodate the varying thickness of the panels.

Another method of flattening wood based panels is to balance one factor, such as an overlay on only one side of the panel, with another factor, such as a higher moisture content in the veneer or particle mat of the other side of the panel prior to pressing. This will sometimes produce satisfactory results, but is very sensitive to many other conditions of the process and therefore unreliable.

Most panels, including lumber plank faced panels, where the lumber planks may differ from panel to panel in thickness, density, grain direction, species and moisture content, require a more reliable method of flattening. Generally, a slightly convex faced panel can be applied to a wall with little difficulties and may sometimes be even more desirable than an absolutely flat panel. A panel with concave faces will tend to pull away from the wall along the edges and cause considerably more trouble. The term flattening used in this description shall include the action of changing a concave faced panel of various degrees into a less concave or flat faced panel, and shall also include changing such a panel into a convex faced panel.

OBJECTS AND SUMMARY OF THE INVENTION

The present invention is directed to a method and apparatus for flattening lionocellulosic panels. I have found that a lignocellulosic panel such as a plywood or flake board having a concave face, can be flattened by indenting the backside of the panel in intervals. This method cannot be used to flatten a panel with a convex face, unless indenting this face would not be objectionable. This method lends itself particularly to the flattening of plywood type panels, but can also be applied to flake board and fiber borad panels with a medium or low density. Panels having a density of over 0.85 $g/cm^3$, made from short particles or fibers cannot successfully be flattened by this method. Plank-Ply panels, which vary in thickness within the panel and are produced in pairs of panels which are uniform in thickness thoughout the pair, can successfully be treated as pairs, by simultaneously indenting both backs, while the matching faces are protected from injury.

When indenting the backside of a panel, for example with a narrow bar, the material at this line is stressed and a small bend toward the indented side will occur. If this process is repeated across the back of a panel, many small bends will be produced at intervals and result in a new curvature of the whole panel. It is desirable to have the indentations relatively close together, so as not to reveal the individual bends but rather a continuous curve. The backside will then show many elongated parallel indentations. If all indentations in one panel would be produced at the same time, for example with a flat plate press, equipped with many elongated protrusions, the change in curvature will be small. One or two rows of indentations at a time should be produced to achieve optimum results.

If two panels are to be treated simultaneously in face to face position, it is best done with a pair of rollers, equipped with elongated protruding elements on their surfaces, positioned generally parallel to the longitudinal axes of the rollers. If only one panel is treated, the roller contacting the panel's face may be covered with rubber. Both rollers are driven at the same speed. Of course, it is also possible to produce these indentations with other instruments, such as for example, with a single bar, moved up and down with the aid of an appropriate mechanical device.

Contrary to expectation, the so treated panels do not lose much of their original stiffness. The new curvature will remain, even after exposing the panels to humidity changes. A further advantage is that the curvature can be controlled after the panel has been produced and conditioned, simply by changing the pressure on the indenting tools or the frequency of the indentations.

Generally, a plywood or Plank-Ply panel will have the tendency to bow in the direction perpendicular to its face grain. Therefore, the indentations will have to run parallel to the face grain. However, the same treatment may be applied, if the bow should be in the direction of the face grain. In this case, the indentations should be applied perpendicular to the face grain. If the panel is cupped, a combination of the two directions is possible.

While the indenting tool may have various shapes, a rounded edge such as the surface of a small cylinder is more gentle to the structure of the wood and therefore preferred over a sharp, square edge. Rather than indenting continuous lines for the full length of the panel, it may sometimes be desirable to interrupt these lines and to off-set these interruptions at adjacent lines. This will result in a more uniform curvature of the panel and will eliminate excessive weakening of the indented areas.

The process and the apparatus of this invention will become more apparent as it is explained in conjunction with the drawings 1 to 4.

DETAILED DESCRIPTION OF THE PREFERRED EMBODIMENTS

Figure 1:
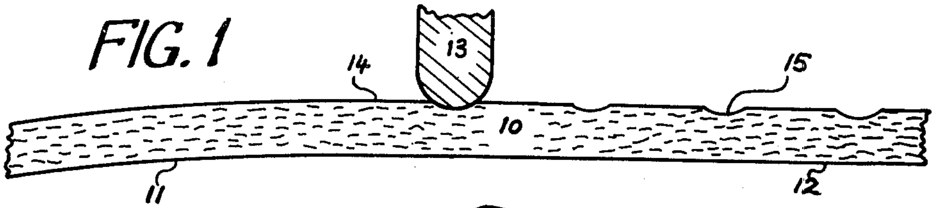
FIG. 1 is a schematic, elevational, sectional view of a panel being flattened in accordance with this invention.

FIG. 1 shows a portion of a cross section of a panel 10 being flattened in accordance with this invention. The face of the untreated part 11 of the panel is concave, while the face of the treated part 12 is flat. An elongated indenting tool 13, shown in its downward position, compresses the backside 14 in intervals, resulting in the spaced indentations 15 and in flattening of the panel.

Figure 2:
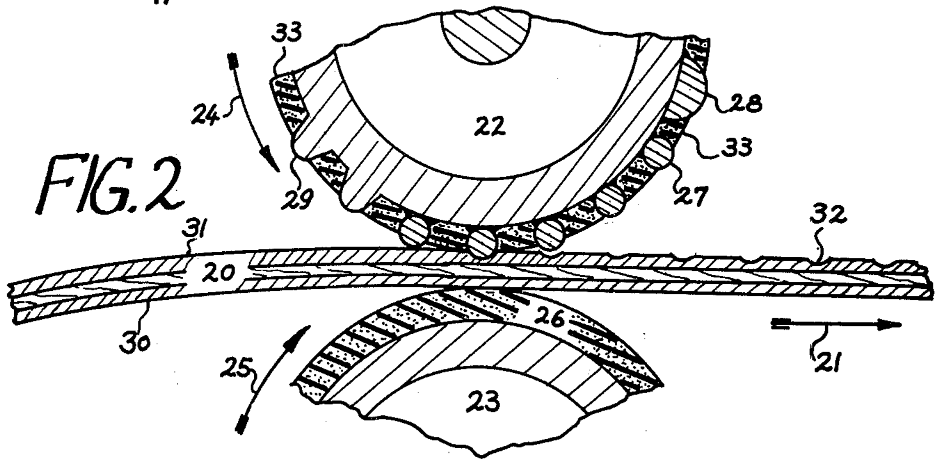
FIG. 2 is an elevational, sectional, schematic view of an apparatus flattening a panel in accordance with this invention.

FIG. 2 shows a portion of a cross section of a panel 20 being flattened with this apparatus. While the panel 20 moves in the direction of arrow 21, the top roller 22 and the bottom roller 23 move in the directions of arrows 24 and 25, respectively. The bottom roller may be covert with a rubber surface 26. The top roller is equipped with elongated protruding elements or indenting tools, which may for example consist of rods 27 or half rods 28, fastened to the surface of the roller or may be an integral part 29 of the roller. The dimension of these indenting tools may vary, depending on the thickness of the panels being flattened. Generally $\frac{1}{4}$ inch to $\frac{3}{4}$ inch diameter rods will be adequate for $\frac{1}{8}$ inch to 1 inch thick panels. While the face 30 of the panel is protected from injury by the rubber cover 26 of the bottom roller, the backside 31 of the panel is indented at intervals 32, which results in flattening of the panel. To facilitate the transport of the panel between the roller pair, and to eliminate the need for separate driving rollers, and also to control to some degree excessive indentations in locally softer areas, a rubber surface 33 may partly fill the spaces between the indenting tools.

Figure 3:
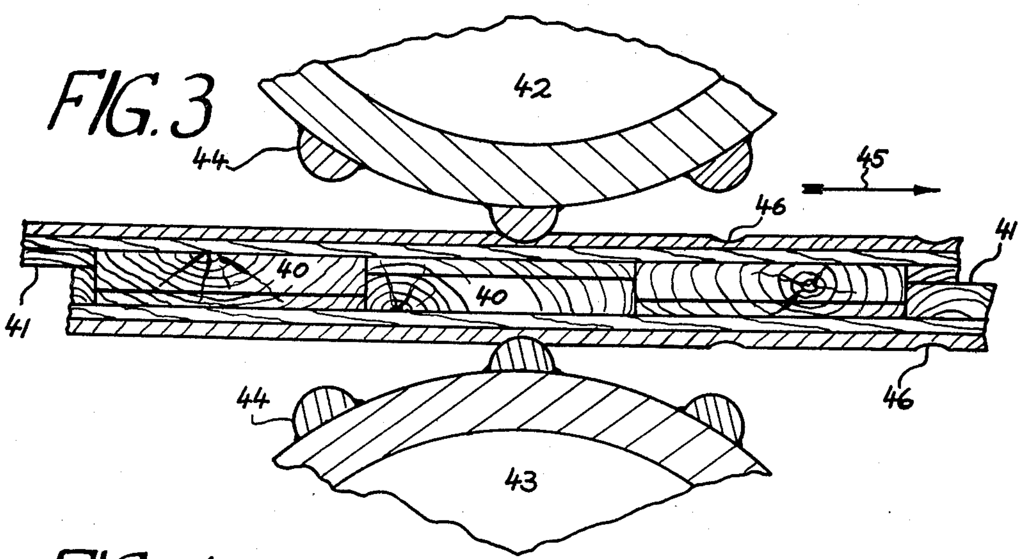
FIG. 3 is an elevational, sectional, schematic view of a panel pair being flattened in accordance with this invention.

FIG. 3 shows part of a section of a panel pair 40 with lumber plank surfaces 41 facing each other. While the individual planks vary in thickness from plank to plank and within a plank, the plank pairs are of equal thickness, which in turn results in a uniform thickness for the panel pair. The top roller 42 as well as the bottom roller 43 are equipped with indenting tools 44. While both panels move as a pair in the direction of arrow 45, both backsides are indented 46 and both panels are flattened.

Figure 4:
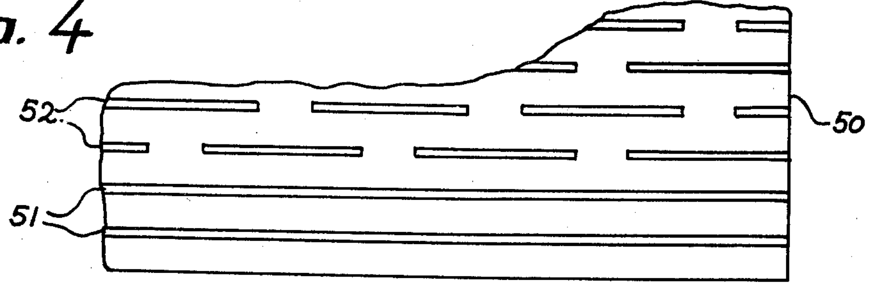
FIG. 4 is an elevational, sectional, view of the backside of a panel flattened in accordance with this invention.

FIG. 4 shows the backside of a section of a panel 50 treated in accordance with this invention. The elongated indentations may for example be continuous 51 or may be interrupted 52, whereby the interruptions may be off-set from interruptions of adjacent indentations. The distance from indentation to indentation depends on many factors such as thickness and type of the panel, degree of curvature change desired, as well as dimension and shape of the indenting tool. Generally, a $\frac{1}{2}$ inch to 3 inch distance from indentation to indentation will be a practical range.

While it is believed that the invention has been described above in sufficient detail to enable a person skilled in the art to practice the invention, the following illustrative examples are given.

EXAMPLE I

A Plank-Ply panel, having an oak lumber face with an average thickness of 5/16 of an inch, a 3/16 inch thick fir veneer core and a $\frac{1}{8}$ inch thick fir veneer back, had prior to flattening a strong concave face, with the bow running perpendicular to the grain direction of the face lumber. It was flattened by indenting the backside substantially parallel to the face grain at intervals of 1 and $\frac{1}{2}$ inches, using a cylindrical indenting tool with a diameter of $\frac{1}{2}$ inch. The resulting indentations have a permanent depth of 20 to 60 thousandths of an inch, depending on the softness and spring back of the respective area.

EXAMPLE II

A $\frac{5}{8}$ inch thick particle board was covered only on one side with a birch veneer. After conditioning the panel, this side developed a concave bow, perpendicular to the grain direction of the veneer. The panel was flattened by indenting the other side of the panel at 1 and $\frac{1}{4}$ inch spaced intervals with an elongated, cylindrical indenting tool, having a $\frac{1}{2}$ inch diameter. The indentations run substantially parallel to the direction of the grain of the veneer. They are interrupted in their length every six inches for a distance of three inches and these interruptions are offset from interruptions of adjacent indentations. The average depth of the indentations after spring back is 40 thousandths of an inch.

While this invention has been described to some extent, it is understood that many variations and modifications are possible, without departing from the scope of this invention.

I claim:

1. A substantially flat building panel having a front face and a backside which had been substantially curved with a concave face having substantially parallel, elongated indentations on its backside in closely spaced relationship, the panel compressed in density under the indentations and being recovered there by partial springback from greater density compression, the panel between adjacent indentations having minute, curved sections, concave on the face and perpendicular to the long axis of said indentations, said curved sections being separated from one another at said indentations by minute bends of the panel in the opposite direction to the curved sections whereby the appearance of the panel is substantially flat.

2. A building panel as in claim 1 with said elongated indentations being interrupted in their length and said interruptions being off-set from interruptions of adjacent indentations.

* * * * *